July 23, 1963

G. A. BARTLETT 3,098,536

AUTOMATIC LOCK-OUT SWITCH

Filed July 2, 1959

GEORGE A. BARTLETT
INVENTOR

BY BLAIR SPENCER & BUCKLES

ATTORNEY

July 23, 1963
G. A. BARTLETT
3,098,536
AUTOMATIC LOCK-OUT SWITCH
Filed July 2, 1959
2 Sheets-Sheet 2
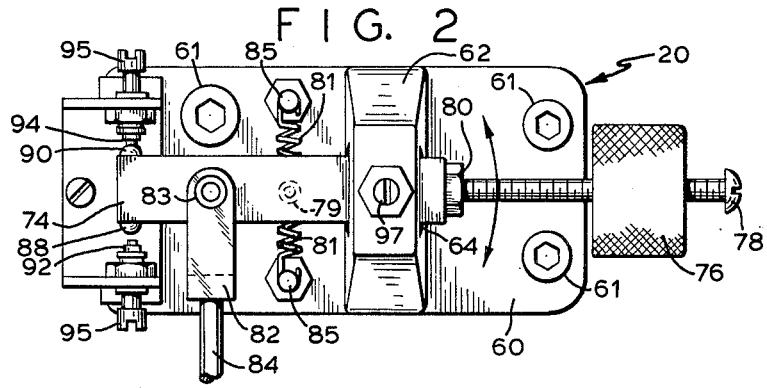
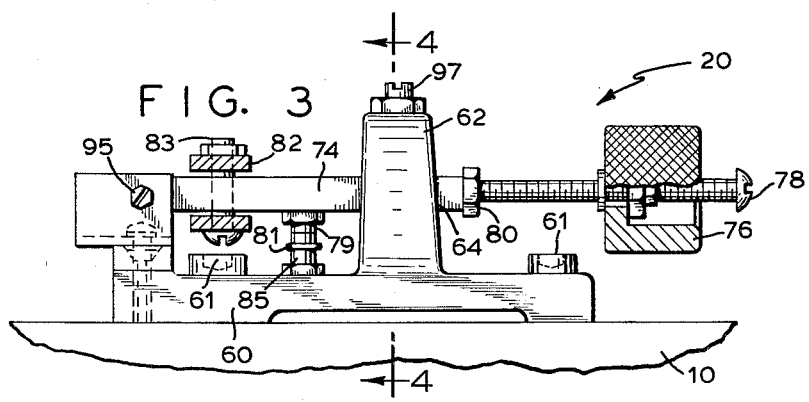
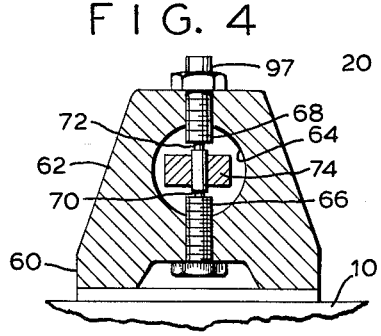
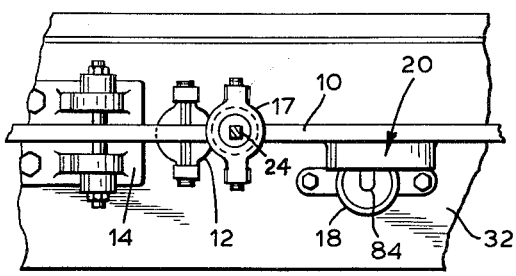
GEORGE A. BARTLETT
*INVENTOR.*
BY
BLAIR SPENCER & BUCKLES
ATTORNEYS.

United States Patent Office 3,098,536
Patented July 23, 1963

3,098,536
AUTOMATIC LOCK-OUT SWITCH
George A. Bartlett, Clarendon Springs, Vt., assignor to Howe Richardson Scale Company, a corporation of Delaware
Filed July 2, 1959, Ser. No. 824,508
2 Claims. (Cl. 177—12)

This invention relates to a switching system for energizing a control circuit, and more particularly to a switching system incorporating a damped inertial switch for actuating a control relay when a predetermined equilibrium condition is attained by a movable element in the apparatus on which said damped inertial switch is mounted.

Measuring and weighing devices and scales with automatic measurement or weight-recording devices have generally required manual or timer actuation of the recording devices to avoid recording incorrect weights, in order to allow movable elements in such apparatus, such as the balance arms of scales, to reach a condition of static equilibrium before measurements or weights are recorded.

Null-sensing electrical switches have been suggested for control-actuating circuits, but when made sufficiently rugged and heavy to avoid pitting and burning of the contact points, such switches lack the desired degree of sensitivity and they tend to function incorrectly. Such lack of sensitivity may produce inaccurate recorded indications of weights or measurements, destroying the reliability and dependability of such automatic recording apparatus.

Accordingly, a principal object of the present invention is to provide automatic-recording measuring apparatus capable of long-continued and accurate operation.

Another object of the invention is to provide apparatus of the above character affording automatic recording of measurements or weights after a movable element of such apparatus attains an equilibrium condition.

A further object of the invention is to provide apparatus of the above character including recording systems actuated by precise null-sensing devices responsive to such equilibrium condition.

Another object of the invention is to provide apparatus of the above character incorporating equilibrium-responsive switching systems for accurate actuation of the recording systems of such apparatus.

Still another object of the invention is to provide null-sensing devices of the above character responsive to equilibrium conditions attained by the movable elements of such apparatus.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIGURE 2 is a front view of the damped inertial switch portion of the apparatus shown in FIGURE 1;

FIGURE 3 is a bottom view, partially in section, of the mechanism shown in FIGURE 2;

FIGURE 4 is a transverse sectional view of the mechanism shown in FIGURES 2 and 3, taken along the line 4—4 in FIGURE 3; and FIGURE 5 is a fragmentary top view of a portion of the apparatus shown in FIGURE 1.

Similar reference characters refer to similar parts throughout the several views of the drawings.

Figure 1:
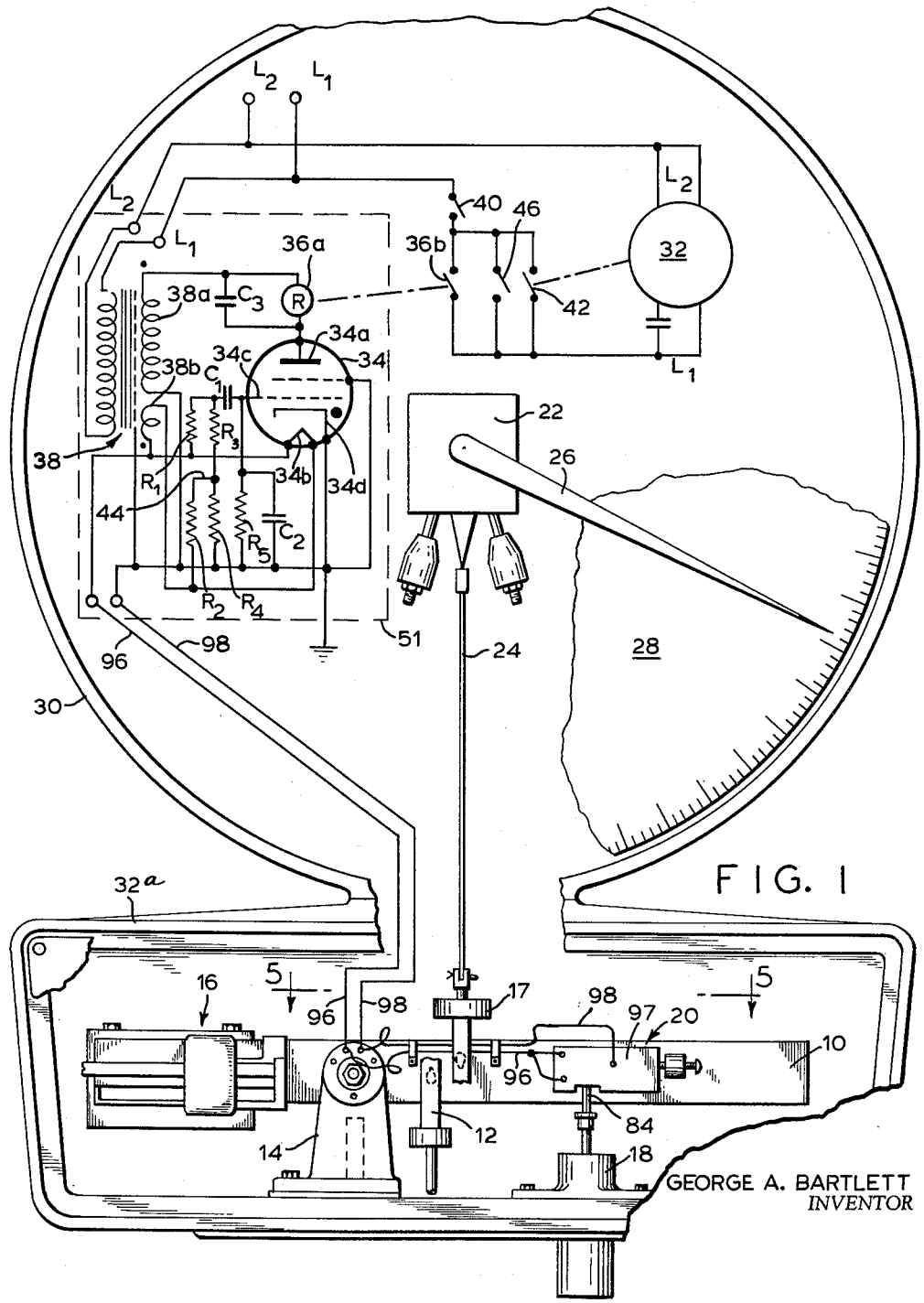
FIGURE 1 is a schematic diagram of one form of automatic-recording weighing apparatus incorporating one embodiment of the present invention.

Referring first to FIGURE 1, the mechanism of an automatic-recording weighing scale is there shown schematically. The mechanism of this apparatus is preferably enclosed in an upper dial head 30 and a housing 32a. A balance beam 10 is supported by and is free for angular movement about a fixed ball bearing fulcrum support 14. Loads to be measured are applied to beam 10 by way of a loading frame 12, and a calibrating mechanism 16 is mounted on beam 10 on the opposite side of fulcrum 14 from loading frame 12.

The angular movement of balance beam 10 about fulcrum 14 is preferably retarded and damped by such means as a fixed dash-pot 18 mounted on housing 32a and connected to beam 10 by way of a damped equilibrium-responsive inertial switch generally indicated at 20 mounted on arm 10 as shown in FIGURES 1 and 5. Switch 20 is designed to open only when beam 10 is in a condition of static equilibrium, and the preferred forms of inertial switch 20 are more fully described hereinafter. This switch 20 acts as a "lock-out" switch, preventing the operation of the recording mechanism until beam 10 reaches a condition of static equilibrium.

A dial head measurement-indicating system generally indicated at 22 is connected by such means as a shackle 17 and a linking member 24 with the angularly movable beam 10, whose movement in response to applied loads causes a pointer 26 to move along a calibrated scale 28. Any other suitable indicating system may be similarly employed, if desired, to display measured weights to the observer.

Indicating system 22 is connected to control indicating or printing type wheels in a printing or recording mechanism (not shown), which is preferably driven by an electric printing motor 32, and motor 32 may be started on command to begin the recording operation when desired. The present invention is directed to an automatic command system for starting this recording operation after balance beam 10 has achieved a condition of static equilibrium following the application of a load by way of loading frame 12.

In the preferred embodiment of the invention as illustrated in FIGURE 1, the dial head housing 30 encloses the indicating system 22, the weight recording mechanism, the printing motor 32 and a recording actuation circuit indicated generally at 51. If desired, certain of these elements may be located at a position remote from the actual weighing mechanism, such as the instrument and control panel of a production line, for example.

The recording actuation circuit 51 and the printing motor 32 are connected in parallel across line terminals $L_1$—$L_2$, as shown in FIGURE 1. Illustratively, the recording actuation circuit 51 may include a thyratron 34 controlled by the switch 20. The thyratron in turn initiates operation of the printing motor 32 by means of a relay R sensitive to the thyratron plate current. More specifically, as shown in FIGURE 1, plate 34a of the thyratron 34 is connected in series with relay coil 36a to a high voltage secondary winding 38a of a power transformer generally indicated at 38. The relay 36 has normally open contacts 36b in series with the motor 32 and a push button start switch 40. A switch 42 in parallel with the contacts 36b is mechanically linked to the motor 32 in a manner to be described.

The control grid bias for the thyratron 34 is supplied by a low voltage winding 38b which also powers the thyratron filament 34b. One terminal of the winding 38b is connected to the thyratron control grid 34c by way of a resistor R1 and a blocking capacitor C1. The other terminal of the winding 38b is connected to a resistor R2, which is in turn connected to the junction of a pair of resistors R3 and R4 between the capacitor C1 and the cathode 34d of the thyratron. The switch 20 is connected between the resistor R1 and the cathode 34d by leads 96 and 98, as shown in FIGURE 1. The parallel combinations of a resistor R5 and a capacitor C2 is connected directly between the grid 34c and cathode 34d.

The relative polarities of the windings 38a and 38b are indicated by the dots. The thyratron can conduct only during alternate half-cycles of the plate voltage when it is positive, and the grid-cathode circuit is effective only during such half-cycles. Therefore, the operation of the grid-cathode circuit may be described as though the winding 38b has a direct-current output (though pulsating), with the negative terminal connected to the resistor R1. Thus, with the switch 20 open, the voltage across the resistor R3 is the grid-cathode voltage, assuming relatively high impedances for the resistor R5 and capacitor C2. This voltage is negative and its value, which depends on the relative resistances of R1, R2 and R3, is such as to prevent thyratron conduction.

When the switch 20 is closed, the negative terminal of the winding 38b is connected to the cathode 34d. This grid 34c and cathode 34d are then both negative with respect to the junction 44 of resistors R2, R3 and R4. The grid, however, is tapped down on the voltage divider comprising resistors R1 and R3, and therefore it is less negative than the cathode with respect to the junction 44. Thus, the grid is positive with respect to the cathode, and the thyratron conducts.

The switch 20 is normally closed from the time a load is applied until the balance arm 10 reaches a static equilibrium condition, and during this time, thyratron current through the relay coil 36a keeps contacts 36b open, thus "locking out" the printing motor 32. A time-delay capacitor C3 across the relay coil 36a prevents closing of the contacts 36b during the brief moments prior to equilibrium when the switch 20 opens as the beam 10 reverses direction. The capacitor C3 also prevents chattering of the relay 36 due to the pulsating nature of the thyratron plate current.

A preferred form of damped inertial switch 20 is shown in detail in FIGURES 2, 3 and 4. The switch 20, designed for a contact-break actuated system, as described above, includes a base 60 secured to beam 10 by bolts 61, as shown in FIGURE 3. A pedestal 62 is mounted on base 60 and is preferably integral therewith. Pedestal 62 has an aperture 64 formed therein, as best shown in FIGURE 4, and two opposed screws 66 and 68 threaded into tapped holes in pedestal 62 project into aperture 64. The adjacent ends of screws 66 and 68 are shaped to form pivot points 70 and 72 between which an arm 74 is pivotally mounted for free angular movement about an axis connecting the pivot points 70 and 72, preferably in a plane substantially parallel to the plane of movement of balance beam 10.

A binding post 97 is integral with or connected to screw 68, and lead 98 from recording actuation circuit 51 (FIGURE 1) is connected to post 97.

Switching arm or beam 74 is adapted to be substantially balanced about its pivotal axis of rotation, and for this purpose such means may be employed as a counterweight 76 adjustably mounted on a screw 78, which is threaded into a tapped hole in the end of arm 74 and locked therein by a nut 80.

Arm 74 is resiliently urged toward a central equilibrium position by such means as centering springs 81—81 (FIG. 2), each secured under slight tension to an arm post 79 on arm 74 and a base post 85 mounted on base 60.

A damping device, such as the dashpot 18 shown in FIGURE 1, is connected to arm 74 by the yoke 82, the screw 83, and the plunger rod 84. Two arm contacts 88 and 90 are mounted on arm 74 respectively adjacent to two switch contacts 92 and 94 mounted on base 60, and the other lead 96 is connected to both switch contacts 92 and 94 by way of binding posts 95. Contacts 92 and 94 limit the pivotal angular movement of arm 74, and are so spaced that neither pair of contacts is closed when arm 74 is in its central equilibrium position.

Whenever balance beam 10 is moving, following the application of a load, dashpot 18 retards the angular movement of arm 74, maintaining switch 20 closed and maintaining a positive bias on grid 34c of thyratron 34, as described above. Dashpot 18 also acts to retard the angular pivotal movement of beam 10 itself, avoiding oscillation or hunting of beam 10. When beam 10 settles in an equilibrium position, springs 81 urge arm 74 into its own central equilibrium position, opening switch 20, removing the positive bias from grid 34c and preventing conduction through thyratron 34, as shown above.

To commence operation, the operator closes the start switch 40 which is provided with suitable electrical or mechanical elements (not shown) to hold it closed until recording is completed. After loading, switch 20 in cooperation with beam 10 and dashpot 18 positively prevents the starting of the recording operation until beam 10 reaches a balanced condition of static equilibrium, thus "locking out" the recording device until equilibrium is attained. When equilibrium is reached, the switch 20 opens to shut off the thyratron 34, closing the contacts 36b and actuating the motor 32 to commence the printing cycle. The motor immediately closes the switch 42 by means of a suitable cam arrangement or relay (not shown), and with the contacts 36b thus shorted out, the load may be removed from the scale without interrupting the printing cycle if the recording mechanism is designed to retain the "equilibrium" measurement until the recording operation is completed.

When the printing cycle is completed, the motor opens the switch 42 and also the switch 40 through suitable linkage (not shown). Thus the circuit is ready for the next weighing, which may have already begun during the printing cycle. A switch 46 in parallel with the switch 42 and contacts 36b may be used to by-pass the thyratron control for manual initiation of the printing cycle.

While the present invention has been described with reference to an individual batch weighing system, with start switch 40 being closed by the operator after each load is applied, it will be evident that the present invention is equally useful in a fully automatic weighing system for continuous production line operation. In this case the arrival of a load on a weighing platform closes start switch 40, to initiate the automatic weighing and recording operations as described above, and the completion of the predetermined recording operation actuates conveying equipment for removing the weighed load and moving the next load into position.

It will also be understood that a "contact-make" version of equilibrium-responsive switch, designed to close when equilibrium is attained, may be used in place of switch 20, with suitable changes in the remaining circuitry being made to initiate the recording operation only after such a switch has closed.

The preferred recording actuation circuit of FIGURE 1 employs thyratron 34 to permit a small current passing through the equilibrium-responsive switch to initiate the energizing of the relay coil. While operation of the equilibrium-responsive switch actuates the recording operation, this switch itself carries only the very small current required to control the grid bias of the thyratron, avoiding the pitting and short useful life of the switch contacts which higher currents produce. Any similar relay device may be employed for this purpose, and if such a relay device is adapted to be actuated by a small control current, the equilibrium-responsive switch will be protected from arcing, and the danger of undesirable pitting and burning of its contact points will be avoided.

It will be seen that the switching systems of the present invention provide the desirable advantages of precision and accuracy, permitting fully or semi-automatic operation of such measuring and weighing devices. The damped, self-centering action of the equilibrium-responsive switch effectively avoids premature actuation of recording devices, and the damping action of the dashpot makes possible this lock-out action of the switch, while also minimizing oscillation or hunting of such movable elements as the balance beam 10 of FIGURE 1.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

I claim:

1. In automatic-recording scale apparatus, a self-positioning balance beam rockably mounted about a substantially horizontal fulcrum axis, an electrically powered motor adapted to operate, a weight-printing device driven by said motor to record the weight of a load applied to said beam, an energizing circuit for said motor including a switch mounted on said balance beam, said switch having an arm rockably mounted on said balance beam about an axis spaced from and substantially parallel to said fulcrum axis and extending substantially parallel to said beam, a pair of electrical switch contacts fixedly mounted in substantially vertically opposed relation on one end of said arm, a pair of spaced vertically opposed contacts fixed on said beam in vertical alignment with said first pair of contacts, said arm extending between the contacts fixed to said beam, resilient means connected to said beam and said arm to bias said arm to a central position between said contacts on said beam to open the contacts when said beam is in an equilibrium position, dampening means connected to said arm to retard movement of said arm upon movement of said beam enabling said contacts to close upon rocking movement of said beam in either direction, said contacts, when closed, establishing a mechanical motion transmitting linkage between said dampening means, said arm, said contacts and said balance beam enabling said dampening means to retard rocking movement of said balance beam about its axis, a relay in said circuit energizable to automatically start operation of said printing motor, said circuit energizing said relay in response to the opening of said contacts when said balance beam is restored to a static equilibrium position.

2. The scale apparatus defined in claim 1 wherein said dampening means comprises a dash pot.

References Cited in the file of this patent

UNITED STATES PATENTS

| | | |
|---|---|---|
| 1,987,286 | Diesenberg | Jan. 8, 1935 |
| 2,027,077 | Von Pein | Jan. 7, 1936 |
| 2,040,072 | Brendel | May 12, 1936 |

FOREIGN PATENTS

| | | |
|---|---|---|
| 508,051 | Great Britain | June 26, 1939 |